Dec. 19, 1939.   A. NAGEL   2,184,000
SHUTTER ACTUATING MECHANISM FOR FOLDING CAMERAS
Filed June 15, 1938
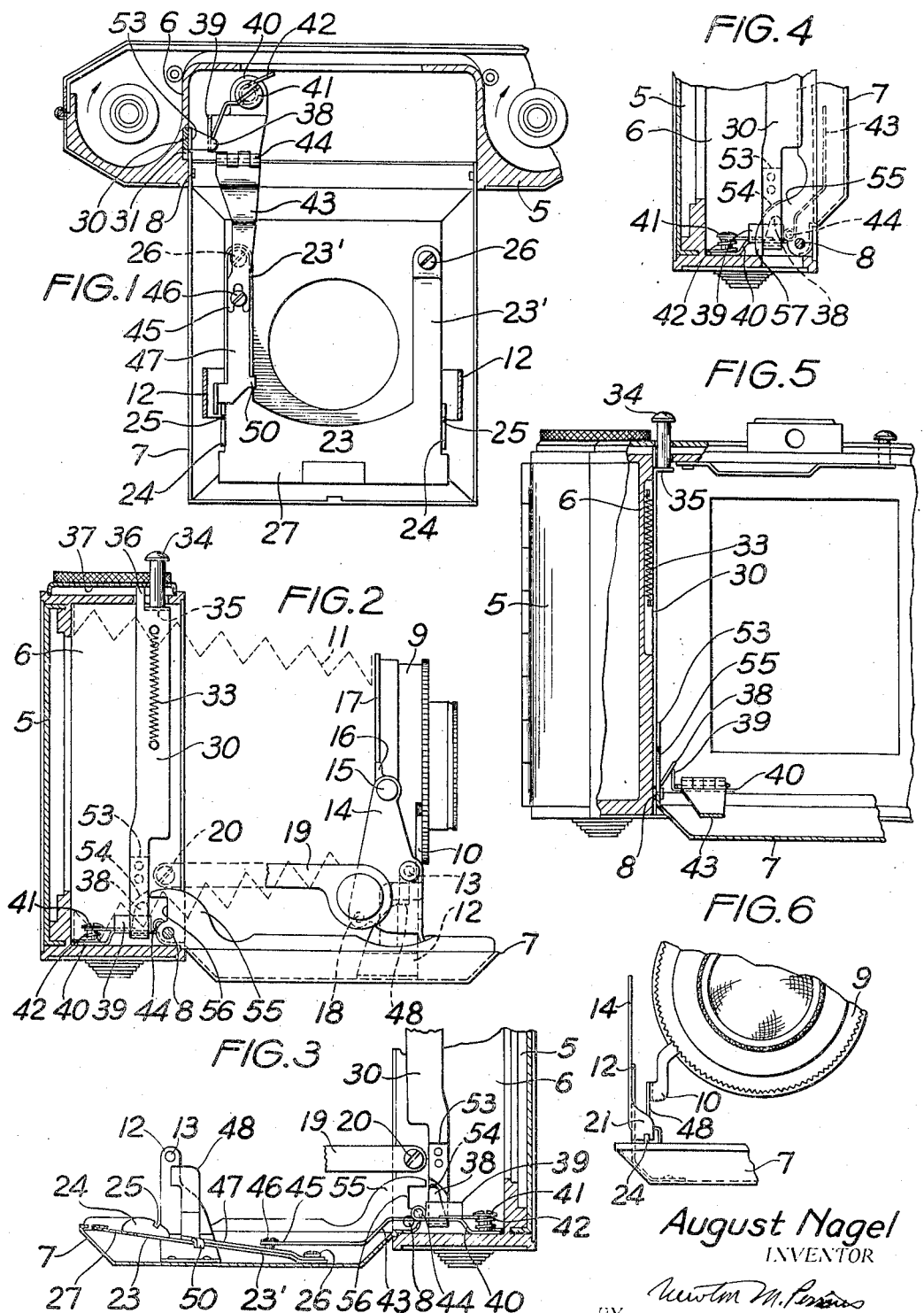
August Nagel
INVENTOR
BY
ATTORNEYS Patented Dec. 19, 1939

2,184,000

UNITED STATES PATENT OFFICE

2,184,000

SHUTTER ACTUATING MECHANISM FOR FOLDING CAMERAS

August Nagel, Stuttgart, Germany, assignor to Eastman Kodak Company, Rochester, N. Y., a corporation of New Jersey Application June 15, 1938, Serial No. 213,866
In Germany August 4, 1937

7 Claims. (Cl. 95—53)

The present invention relates to photography, and particularly to folding cameras having the shutter release mounted on the camera body.

One object of my invention is to provide a folding camera in which the actuation of the shutter is effected by a release mounted on the camera body. Another object is to provide a folding camera in which the shutter release on the camera body is operably connected with the shutter trigger when the camera is opened to its picture-taking position. A further object is to provide a shutter release mechanism, part of which is on the camera body, and part of which is on the camera bed, and in which the part on the camera bed is mounted on a releasable locking member on the bed which serves to lock the shutter assembly in its picture-taking position thereby offering a construction more simple than heretofore presented. And yet another object is to provide a stop member on the bed which is adapted to engage and hold the shutter release on the camera body in an inoperative position when the camera bed is moved to its folded position. And another object is to arrange and form said stop member so that it will prevent operation of the release until the camera bed is moved completely to its picture-taking position.

Briefly, my invention consists of a folding camera wherein a bed is rotatably hinged to the camera body to act as a front closing part for said body as well as a base on which the shutter assembly is foldably mounted to be automatically or manually brought into picture-taking position when the bed is rotated to its open position, said shutter assembly being locked in its picture-taking position when engaged by a releasable locking member mounted on the bed. A shutter release slidably mounted on the camera body is connected to the trigger on the shutter assembly through a suitable linkage, a portion of which is mounted on the locking means on the bed, thus simplifying previous similar structures where a separate member was mounted on the bed to serve in this capacity. The shutter release on the camera body is held in its inoperative position when the camera is moved from its picture-taking position by virtue of an arcuate stop member connected to the camera bed and pivoted at the hinging point of said bed which engages a lug on the shutter release.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which, Fig. 1 is a plan view of a folding camera in extended position with certain parts removed to show a preferred embodiment of the shutter release and its connection with the locking member on the camera bed, Fig. 2 is a side view of the camera, partly in section, and showing the shutter release on the camera body, the stop member on the bed removed from the path thereof, and the shutter assembly locked in picture-taking position, Fig. 3 is a partial side view in section, showing the connection between the locking member on the bed and the shutter releasing mechanism, Fig. 4 is a partial section of the camera showing the bed folded to its closed position, Fig. 5 is a front elevation of the camera in extended position with certain parts removed and in section to show the method of mounting the shutter release on the camera body, and Fig. 6 is a partial front view of the camera showing the connection between the shutter release mechanism and the shutter trigger, as well as the erecting mechanism for the objective.

Like reference characters refer to corresponding parts throughout the several figures.

As illustrated in the drawing, the camera includes a recessed body portion 5 to the side walls 6 of which the bed 7 is pivoted as indicated at 8, said bed being adapted to move between an extended picture-taking position wherein it is horizontal and at right angles with the camera body, see Figs. 1, 2, and 3, and a closed position, see Fig. 4, wherein it acts as a door to close the recess in the camera body. The shutter assembly, indicated broadly as 9, includes an objective and a between-the-lens shutter which is operated by the trigger 10 in a well-known manner. A foldable bellows 11 is connected between the shutter assembly 9 and the rear wall of the recess in the camera body.

The shutter assembly is mounted on the folding bed in a known manner, and may be folded into the camera body and covered by the folding bed. Such an arrangement may include two rigid supports 12 fixed to and extending vertically from the camera bed 7, and on these supports are pivotally mounted at 13 levers 14 connected by pivots 15 to lugs 16 on the lens board or front 17. The lower end of the levers are connected by pivots 18 to links 19 which are in turn connected to the camera body at their rear ends by pivots 20.

The pivots are so arranged that when the bed is opened, each lever 14 is rocked about its pivot 13 by means of the link 19 so as to assume a substantially upright position. At the same time the lens board is free to rock about pivot 15, and owing to the stiffness of the bellows, will normally remain in a substantially vertical plane.

The levers 14 are of angle section, or are provided with inwardly projecting stops or flanges 21 which engage the front edges of the fixed support 12 when the levers are erected. In this way the downward movement of the bed 7 is definitely limited. Any return movement is prevented by means of a locking member 23 which includes upstanding ears 24 having slots 25 into which the lower ends of the flanges 21 are adapted to snap. The locking member 23 comprises a U-shaped member having two arms 23' extending rearwardly of the bed, and being clamped to the bed 7 by pins 26 at the end of each arm. The arms 23' of the locking member are offset, as indicated in Fig. 3, so that the forward end of the locking member is in a position wherein the ears 24 are adapted to engage the flanges 21 when the camera is opened. To close the camera, the locking member 23 is forced downwardly by applying pressure to the cross member 27 thereof, whereupon the flanges 21 are released from the ears 24 and the lens board can be folded into the camera. This general form of lens erection and locking mechanism is old in the art, being similar to that shown in U. S. Patent 1,974,655, to Hugo Nagel, and is shown and described herein to show the relation of the shutter actuating mechanism, described hereinafter, with respect thereto.

The shutter actuating mechanism includes a shutter release 30 which is slidably mounted in a groove 31 in the side wall 6 of the camera body, and which is normally moved to its inoperative position by spring 33 pinned at one end to the shutter release and at the other end to a side wall of the camera body. A push button 34 extending through the top of the camera body is fastened to a flange 35 on the upper end of the release, and the finger 36 engages the under side of the top 37 to limit the upward movement of the release member under the action of the spring 33.

The lower end of the release member 30 is provided with an upwardly inclined bent portion 38 which engages the upturned edge 39 on the lever 40 which is pivoted at 41 to the bottom of the camera body. This lever 40 is normally spring pressed toward the release member 30 by means of a spring 42, and is connected to the link 43 by means of a hinge 44 which allows the camera bed to fold up. The forked end 45 of the link 43 embraces the pin 46 fixed to the lever 47 which in turn is pivoted at its rear end to pin 26 which fastens the locking member 23 to the bed 7. The forward end of the lever 47 is provided with an upturned end 48 which lies in the path of the shutter trigger 10, and which presses said shutter trigger when the release member 30 is depressed to make the inclined portion 38 move the lever 40 about its pivot whereupon the link 43 pivots the lever 47 to a position wherein it actuates the shutter 10. It will be appreciated that mounting the lever 47 on the locking member 23 in the manner described makes for a more simple arrangement than heretofore presented. If the lever 47 were not pivoted to the pin 26 fixing the locking member 23 to the camera bed, a special pivot pin or lever would be required on the bed to operatively support the lever 47. The shutter actuating mechanism is limited in its movement to its inoperative position under the action of springs 33 and 42 when the turned down shoulder 50 on the lever 47 engages the arm 23' of the locking member 23.

For preventing the operation of the shutter actuating mechanism when the camera bed is moved from the picture-taking position, the following mechanism is provided. Fixed to the inside face of the release member 30 is a lug 53 the lower face 54 of which is arcuate in form, see Fig. 3. The camera bed 7 has a sector-shaped shoulder piece 55 on the rear end thereof which is pivoted on the axis of the camera bed, and which engages the arcuate face 54 of the lug 53 when the camera bed is moved to its closed position to positively hold the release member 30 in its inoperative position and prevent an actuation thereof. The sector-shaped shoulder piece is provided with a cut-out portion 56 which receives the upturned end 38 of the release member, as indicated in Fig. 4. The nose 57 of the sector-shaped shoulder piece 54 is of such a length that it releases the lug 53 on the release member 30 only when the camera bed is in its full open position, see Fig. 3, so that even if the bed is partially moved from its full open position the nose 57 engages the lug and prevents actuation of the release member. The arcuate face of the lug 53 and the engaging surface of the sector-shaped shoulder correspond so that when the bed is closed the sector-shaped shoulder will tend to cam the release member to its full raised position should the spring 33 fail to serve in this capacity. Although this shoulder 55 has been shown as an integral part of the bed member 7, it will be readily understood that the same could be a separate piece pivoted to the axis of the bed and connected to the bed in any suitable manner so as to be moved therewith.

Arrangements are known by means of which a shutter release located on the camera body is prevented from operating so long as the camera housing is closed, but in these arrangements it is possible to press the release member unintentionally before the objective has been brought completely into the necessary picture-taking position so that accidental exposure of the light sensitive layer may occur. It will be readily understood from the above description how the present improvement, necessitating a full open position of the bed before the shutter release member can be actuated, avoids this disadvantage. Further, it will be understood that the described arrangement of the shutter release mechanism offers a simplified construction by attaching one member of the release mechanism to or on the locking member of the camera located on the camera bed.

Although I have shown and described one specific embodiment of my invention, I am fully aware that many modifications thereof are possible. My invention, therefore, is not to be restricted except in so far as is necessitated by the prior art and by the spirit of the appended claims.

Having thus described my invention, what I declare is new and desire to secure by Letters Patent of the United States is:

1. In a photographic camera, the combination with a camera body, a bed hinged to said camera body and movable to closed and open positions, a shutter assembly adjacent said bed including a trigger and movable to folded and picture-taking positions, means on said bed for releasably locking said shutter assembly in its picture-taking position, a shutter release mounted on the camera body to move between a normal extended position, wherein it is inoperative, and a retracted position, wherein it is operative, suitable means operably connecting said release and said trigger when the camera parts are in picture-taking position, of a stop means on said camera bed adapted to automatically engage and hold the shutter release in its extended position when the camera bed is moved from its picture-taking position.

2. In a photographic camera, the combination with a camera body, a bed hinged to said camera body and movable to closed and open positions, a shutter assembly adjacent said bed including a trigger and movable to folded and picture-taking positions, means on said bed for releasably locking said shutter assembly in its picture-taking position, a shutter release mounted on the camera body to move between a normal extended position, wherein it is inoperative, and a retracted position, wherein it is operative, suitable means operably connecting said release and said trigger when the camera parts are in picture-taking position, a lug fixed to the shutter release, of a stop member integral with said camera bed adapted to automatically engage said lug and hold the shutter release on the camera body in its extended position when the camera bed is moved from its closed position.

3. In a photographic camera, the combination with a camera body, a bed hinged to said camera body and movable to closed and open positions, a shutter assembly adjacent said bed including a trigger and movable to folded and picture-taking positions, means on said bed for releasably locking said shutter assembly in its picture-taking position, a shutter release mounted on the camera body, suitable means operably connecting said release and said trigger when the camera parts are in picture-taking position, of an arcuate shaped lug on the shutter release, and an arcuately shaped stop member on the bed adapted to engage the lug on the shutter release when the camera bed is moved from its picture taking position whereby the shutter release is adapted to be cammed to its extended position and held against operation when the camera bed is moved to its folded position.

4. In a photographic camera, the combination with a camera body, a bed hinged to said camera body and movable to closed and open positions, a shutter assembly adjacent said bed including a trigger and movable to folded and picture-taking positions, means on said bed for releasably locking said shutter assembly in its picture-taking position, a shutter release mounted on the camera body to move between a normal extended position, wherein it is inoperative, and a retracted position, wherein it is operative, suitable means operably connecting said release and said trigger when the camera parts are in picture-taking position, of an arcuate shaped lug on the shutter release, and an arcuately shaped stop member connected to and movable with said bed and adapted to engage the lug on the shutter release when the camera bed is moved from its picture-taking position and hold said release against movement from its extended position during the time said camera bed is not in its picture taking position, said arcuately shaped stop member pivoted on the hinge axis of the bed.

5. In a photographic camera, the combination with a camera body, a bed hinged to said camera body and movable to closed and open positions, a shutter assembly adjacent said bed including a trigger and movable to folded and picture-taking positions, a releasable locking member on the bed adapted to engage and lock the shutter assembly in its picture-taking position, a shutter release mounted on the camera body to move between a normal extended position, wherein it is inoperative, and a retracted position, wherein it is operative, suitable means operably connecting said shutter release and said shutter trigger when the camera parts are in picture-taking position, and including a lever pivoted to the locking member on the bed and adapted to positively engage said releasable locking member to limit movement of the shutter actuating mechanism to its inoperative position, and a stop member on said camera bed adapted to engage and hold the shutter release against movement to its retracted position when, and during the time, the bed is moved from its picture-taking position.

6. In a photographic camera, the combination with a camera body, a bed hinged to said camera body and movable to closed and open positions, a shutter assembly adjacent said bed including a trigger and movable to folded and picture-taking positions, a U-shaped releasable locking member pinned to the bed adapted to engage and lock the shutter assembly in its picture-taking position, a shutter release mounted on the camera body to move between a normal extended position, wherein it is inoperative, and a retracted position, wherein it is operative, suitable means operably connecting said shutter release and said trigger when the camera parts are in a picture-taking position, and including a lever pivoted at one end to a pin holding the locking member to the bed, the other end of said lever adapted to engage the shutter trigger, a lug on said lever adapted to engage said locking member for positively limiting the movement of said shutter actuating mechanism to its inoperative position, and a stop member on the bed adapted to engage and hold the shutter release against movement to its retracted position when, and during the time the bed is removed from its picture-taking position.

7. In a photographic camera, the combination with a camera body, a bed hinged to said camera body and movable to closed and open positions, a shutter assembly adjacent said bed including a trigger, and movable to folded and picture-taking positions, a U-shaped releasable locking member pinned to the bed and adapted to engage and lock the shutter assembly in its picture-taking position, a shutter release slidably mounted on the camera body to move between an extended position, wherein it is inoperative, and a retracted position, wherein it is operative, and normally spring pressed to its extended position, means connecting said shutter release and said trigger when the camera parts are in a picture-taking position, and including a lever pivoted at one end to the locking member on the bed, the other end of said lever adapted to engage the shutter trigger, a hinged lever system pivoted at one end in the camera body and at the other end to a pin fixed to said lever whereby an arcuate movement transmitted to the lever system upon actuation of the shutter release causes the lever to operate the trigger, and a stop member on the bed adapted to engage and hold the shutter release in its extended position when, and during the time, the bed is removed from its picture-taking position.

AUGUST NAGEL.